United States Patent Office 2,750,554
Patented June 12, 1956

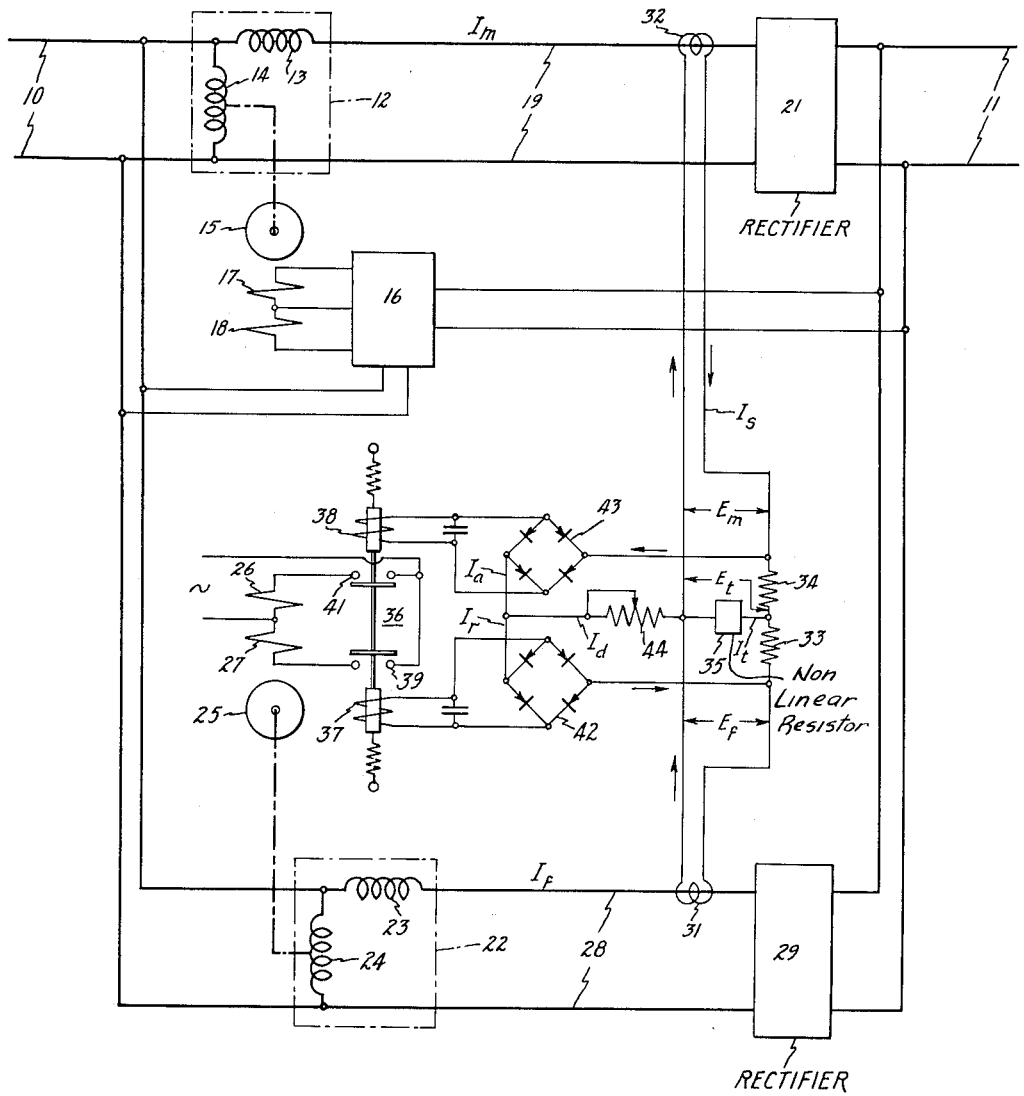

2,750,554

ELECTRIC CIRCUIT

Lewis R. Runaldue, Dalton, Mass., assignor to General Electric Company, a corporation of New York Application March 22, 1954, Serial No. 417,722

6 Claims. (Cl. 321—19)

This invention relates to electric circuits, and more particularly, to improvements in control circuits for automatic voltage regulators which adjust the voltage of interconnected power circuits.

When a plurality of induction voltage regulators are paralleled together in order to handle a load too large for a single regulator, it is desirable that the control circuit include means for equalizing the load among regulators, means for reducing circulating current in the interconnected circuits, and means for insuring that the output voltage or current as desired will hold constant. Lennox Patent 2,323,716, assigned to the same assignee as the present application, discloses a control circuit for interconnected voltage regulators wherein the circulating currents are segregated from the load. Minneci Patent 2,322,249, also assigned to the same assignee as the present application, discloses a control circuit for interconnected voltage regulators wherein a reduction in the number of regulators in the circuit will not interfere with a constant voltage output.

The Lennox and Minneci patents disclose the conventional arrangement of automatic voltage regulator control in which the regulator setting is controlled by a motor which is in turn controlled by a voltage regulating relay and line drop compensator operating off of the load side of the regulator. The Lennox and Minneci circuits are directed particularly to alternating current loads.

The present invention is directed particularly toward a circuit in which the output from the regulator is rectified and has as one of its objects the paralleling of an additional regulator, the output of which is also rectified.

It is another object of the invention to provide a master regulator and follower regulator arrangement having a control which will cause the follower regulator to supply a direct current output from its rectifier which is proportional to that supplied by the master regulator through its rectifier.

Other objects will become apparent from a perusal of the following specification in conjunction with the annexed drawing which illustrates a preferred embodiment of the invention in diagrammatic form.

Briefly stated, in accordance with one of its aspects, the invention is directed to an electric power system operable on a direct current load from an alternating current source wherein a master induction voltage regulator has a rectifier connected to the output for converting the alternating current to direct current, a follower induction voltage regulator and rectifier connected in parallel with the master regulator and rectifier, a control motor connected to the rotor of the follower regulator, and a control motor regulator circuit for maintaining a predetermined relation between the output of the follower regulator and the output of the master regulator, the control circuit consisting of a differential relay having two contacts, one of which closes to complete a circuit which causes the control motor to advance the setting of the follower regulator and the other of which closes to complete a circuit which operates the control motor to retard the setting of the follower regulator. A fullwave bridge rectifier in the energizing circuit of each magnetic coil of the differential relay is inductively coupled to the alternating current output of each induction voltage regulator, the inductive couplings being connected to the rectifiers in series aiding relationship through two resistors, the output of one of the bridge rectifiers energizing one coil of the differential relay and the output of the other bridge rectifier energizing the other coil of the differential relay.

Voltage regulator circuits of the type described herein are particularly suitable for use in electroplating establishments and the like. An alternating input voltage 10 is converted to a direct output voltage 11 by the apparatus of this invention. The alternating input voltage 10 is connected to a master voltage regulator 12 shown in somewhat schematic form. The voltage regulator 12 is of the conventional type having a stationary coil 13 and rotor coil 14 which may be rotated by a motor 15 to control the output of the master regulator 12. Control of the motor 15 is exercised from a voltage regulating relay and line drop compensator 16, shown in block form, through a pair of windings 17 and 18 of the motor 15. Since the circuit of the voltage regulating relay and line drop compensator 16 is conventional and similar to the regulating relays and compensators used in the Lennox and Minneci patents previously referred to it has not been described in detail. Normally the master regulator 12 has the automatic control shown but regulators are also available with a current regulating relay or a manual control of the rotor coil 14. The follower regulator control of this invention is also applicable to an arrangement wherein the master regulator has automatic current regulation or is set manually.

A circuit 19 connects the alternating output voltage of the master regulator 12 to a rectifier 21 shown in block form. The rectifier 21 may be any one of a number of types well known to those skilled in the art. A mechanical rectifier may be used or the circuit may include ignitrons or other types of electronic tubes. The various types of rectifiers utilizing semi-conducting materials are also satisfactory in certain types of installations. All of these rectifier circuits are well known to those skilled in the art and will not be described in further detail here. The direct current circuit output from the rectifier 21 is connected to the output circuit 11.

A follower regulator 22 is connected to the incoming alternating circuit 10 in parallel with the master regulator 12. The follower regulator 22 is similar to the master regulator 12 in having a stationary coil 23, a rotor coil 24, a rotor control motor 25, and motor control windings 26 and 27. The output of the follower regulator 22 is connected by means of an alternating output circuit 28 to a rectifier 29 which may be similar to the rectifier 21 associated with the master regulator 12. The direct current output of the rectifier 29 is connected to the output circuit 11 in parallel with the output from the rectifier 21.

The control circuit whereby the setting of the follower regulator 22 is automatically synchronized with the setting of the master regulator 12 will now be described in detail. The output circuit 28 of the follower regulator 22 is connected by means including current transformers 31 and 32 in series aiding relationship to the output circuit 19 of the master regulator 12. The circuit connecting the current transformers 31 and 32 includes a pair of resistors 33 and 34, which may conveniently be of about 500 ohms resistance, and a non-linear resistor 35, which may be composed of silicon carbide as disclosed in McEachron Patent 1,822,742, assigned to the General Electric Company, is connected in the circuit with the current transformers 31 and 32 to protect against excessive voltages developing across rectifier bridges 42 or 43.

Operation of the rotor control motor 25 of the follower regulator 22 is under the control of a differential relay 36 having two sets of separately energizable windings 37 and 38, both of which are normally simultaneously energized. Greater energization of the winding 37 than that of the winding 36 closes a pair of contacts 39 to complete a circuit through the winding 27 of the motor 25 which causes operation of the rotor control motor 25 to retard the setting of the voltage regulator 22 and reduce its output. Greater energization of the winding 38 than that of the winding 37 of the relay 36 closes a pair of contacts 41 to complete a circuit through the winding 26 of the motor 25 which advances the setting of the follower regulator 22 to increase its output. The relay coil 37 is connected to the current transformer circuit through a full-wave bridge type rectifier 42 and the relay coil 38 is connected to the current transformer circuit through a full-wave bridge type rectifier 43. The sensitivity of operation of the relay 36 is adjusted by the setting of a variable resistor 44 connected between the bridge circuits 42 and 43 and current transformer circuit.

Operation of the control mechanism to synchronize the setting of the follower regulator 22 with that of the master regulator 12 will now be described. Let it be assumed that at a particular instant the direction of current flow is that shown by the arrows in various parts of the control circuit. The currents and voltages in various parts of the control circuit are indicated by the letters I and E. Consider the case where $I_m$ and $I_f$, the currents supplied by the master and follower regulators, are equal. If the ratios of the current transformers 32 and 31 are equal and their other characteristics the same, the secondary voltages $E_m$ and $E_f$ will be equal and voltage $E_t$ and current $I_d$ will both be zero. Resistors 33 and 34 determine the magnitudes of $E_m$ and $E_f$ for given values of $I_m$ and $I_f$. If $I_f$ remains fixed and $I_m$ is increased, voltage $E_m$ increases and $E_f$ decreases. At the same time, $E_t$ increases. If $I_a$, $I_r$ and $I_t$ are neglected for the moment, since $I_s$, the secondary current, is common to both of the current transformers 31 and 32, the increase in $I_s$ is used to supply some of the exciting current for the core of current transformer 31 resulting in a decrease in $E_f$ and increase in $E_m$.

If $I_m$ is decreased, or held fixed and $I_f$ increased, $E_f$ becomes larger and $E_m$ smaller. Voltage $E_t$ increases again but now it is 180° out of phase with that for the other case described above. Thus, $E_f/E_m$ is proportional to $I_f/I_m$. Although the relationship is not necessarily linear it approximates linearity when the difference between $I_f$ and $I_m$ is small.

The above relationship applies to the circuit illustrated and small differences between $I_m$ and $I_f$ are utilized so that energization of winding 38 predominates and contacts 41 close if $I_m$ is the larger, and winding 37 predominates and contacts 39 close if $I_f$ is the larger. If the current in either coil of the relay 36 predominates one or the other of the contacts 41 and 39 will close depending on which coil has the most current.

If $I_m$ is larger than $I_f$, $E_m$ will be larger than $E_f$, and current $I_a$ to energize the coil 38 supplied through the bridge type rectifier 43, the winding 38, back through the rectifier 43, the variable resistor 44, the current transformer 32, and back again to the rectifier 43 will be larger than current $I_r$ supplied to the winding 37 energized by a circuit from the variable resistor 44 through the bridge rectifier 42, the winding 37, again through the rectifier 42, the current transformer 31, and back to variable resistor 44. The current $I_d$ through resistor 44 is the difference between currents $I_a$ and $I_r$; that is $I_d = I_a - I_r$. If the reverse situation prevails, then $I_r$ will be larger than $I_a$ and $I_d$ is the difference between $I_r$ and $I_a$.

The variable resistor 44 can be varied to decrease the sensitivity of the control if desirable since as the resistance of 44 is increased and current $I_d$ decreases the difference between $I_a$ and $I_r$ is therefore decreased. The impedances of the current transformer secondaries must of necessity be high to obtain the greatest possible relay sensitivity. This means that if one current transformer tries to force current into the secondary of the other large voltages will develop. The non-linear resistor 35 placed in parallel between the junctions connecting the secondaries of the current transformers 31 and 32 and resistors 33 and 34 protects the rectifier bridges and relay coils if the currents $I_m$ and $I_f$ accidentally become greatly different in values.

Although the description has particular reference to induction voltage regulators, it will be understood by those skilled in the art that step voltage regulators could be used equally as well. Also it would be apparent to those versed in the art that windings 37 and 38 could be control windings in a magnetic amplifier used to control a saturable reactor type voltage regulator, or that resistors could replace windings 37 and 38 to control an electronic tube amplifier for the same purpose, or coils 37 and 38 could be used as field coils of a direct current generator used as an exciter for a follower alternating current generator.

While the present invention has been described with reference to a particular embodiment thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letter Patents of the United States is:

1. In an electric power system operable on a direct current load from an alternating current source, a master voltage regulator including a control motor, a first rectifier connected to the output of said master regulator for converting the alternating current output of said master regulator to direct current, means for regulating the control motor of said master regulator in response to the direct current output, a follower voltage regulator including a control motor, said follower regulator being connected in parallel with said master regulator, a second rectifier connected to the output of said follower regulator, the output of said second rectifier being connected in parallel to the output of said first rectifier, and means for maintaining a predetermined relation between the output of said follower regulator and the output of said master regulator, said means comprising a differential relay inductively coupled in a differential circuit to the output of both regulators, said relay having a first set of contacts which close to complete a circuit to the follower regulator rotor control motor to advance said regulator when its output lags behind the output of said master regulator and a second set of contacts which close to complete a circuit to the follower regulator control motor to retard said regulator when its output exceeds the output of said master regulator.

2. An electric power system as claimed in claim 1 in which the regulators are induction voltage regulators.

3. A system as claimed in claim 1 wherein the inductive coupling of said differential relay to the output of said regulators is by means of current transformers.

4. In an electric power system operable on a direct current load from an alternating current source, a master inductive voltage regulator, a rectifier connected to the output of said regulator for converting the alternating current output to direct current, a follower induction voltage regulator and rectifier connected in parallel with said master regulator and rectifier, a control motor connected to the rotor of said follower regulator, and a control motor regulator circuit for maintaining a predetermined relation between the output of said follower regulator and the output of said master regulator, said circuit comprising a differential relay having two contacts, one of said contacts closing to complete a circuit which operates the control motor to advance the setting of said follower regulator when its output lags the output of said master regulator and the other of said contacts closing to complete a circuit which operates the control motor to retard the setting of said follower regulator when its output exceeds the output of said master regulator, a full-wave bridge rectifier in the energizing circuit of each magnetic coil of said differential relay, an inductive means connected in the alternating current output of each induction regulator, two resistors, a circuit joining said inductive means in series aiding relationship through said resistors, and a circuit connecting one of said bridge rectifiers across one of said inductive means and the other bridge rectifier across the other inductive means.

5. An electric power system as claimed in claim 4 wherein the circuit connecting the bridge rectifiers across the inductive means includes a variable resistor to control the sensitivity of operation of the differential relay.

6. An electric power system as claimed in claim 4 wherein a non-linear resistor connected across the circuit joining the inductive means protects the system against excessive voltage developed across the bridge rectifiers.

No references cited.